United States Patent
Kim et al.

(10) Patent No.: US 6,549,714 B1
(45) Date of Patent: Apr. 15, 2003

(54) OPTICAL WAVEGUIDE

(75) Inventors: Jung-Hee Kim; Kwan-Soo Han, both of Seoul; Woo-Hyuk Jang, Yongin; Dong-Hack Suh, Daejeon; Tae-Hyung Rhee, Sungnam, all of (KR)

(73) Assignee: Samsung Electronics, Co., Ltd., Suwon (KR)

( * ) Notice: Subject to any disclaimer, the term of this patent is extended or adjusted under 35 U.S.C. 154(b) by 0 days.

(21) Appl. No.: 09/551,869

(22) Filed: Apr. 18, 2000

(30) Foreign Application Priority Data

Apr. 19, 1999 (KR) .............................................. 99/13807

(51) Int. Cl.⁷ ............................................. G02B 6/10
(52) U.S. Cl. ......................... 385/143; 428/68; 428/212
(58) Field of Search ........................... 428/68, 76, 212; 385/143, 123, 129

(56) References Cited

U.S. PATENT DOCUMENTS 5,598,501 A * 1/1997 Maruo et al. ............... 385/143

* cited by examiner

*Primary Examiner*—Alexander S. Thomas
(74) *Attorney, Agent, or Firm*—Robert E. Bushnell, Esq.

(57) ABSTRACT

An optical waveguide including a core layer formed of a polymer, and a cladding layer placed in proximate to the core layer, the cladding layer being formed of a polymer having a refractive index smaller than the refractive index of the polymer for the core layer, wherein the polymers for the core and cladding layers are selected from the copolymers having the formula (1):

(1)

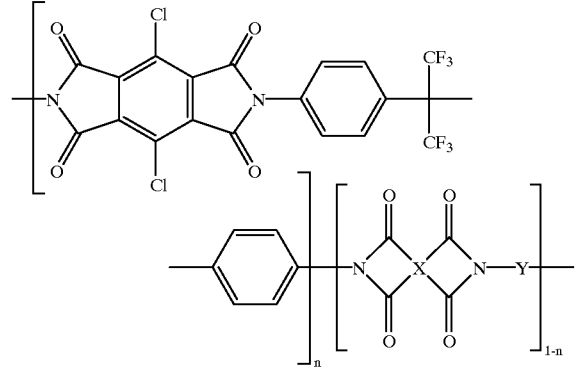

where X is

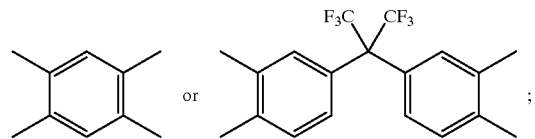

Y is

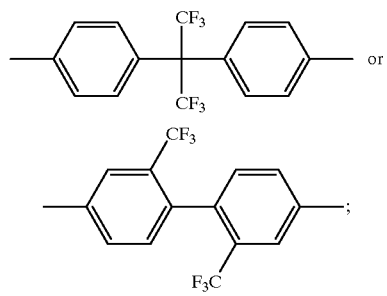

and
n is a mole fraction in the range of $0.05 \leq n < 1$.

19 Claims, 1 Drawing Sheet

OPTICAL WAVEGUIDE

CLAIM OF PRIORITY

This application makes reference to, incorporates the same herein, and claims all benefits accruing under 35 U.S.C. §119 from my application OPTICAL WAVEGUIDE filed with the Korean Industrial Property Office on Apr. 19, 1999 and there duly assigned Serial No. 13807/1999.

BACKGROUND OF THE INVENTION

1. Field of the Invention

The present invention relates to an optical waveguide, and more particularly, to an optical waveguide formed of a variable refractive index polyimide to give a great difference in the refractive index between core and cladding layers.

2. Description of the Related Art

The manufacture of optical waveguide devices utilizing techniques learned from semiconductor or micro mechanical systems (MEMS) manufacture has recently become commonplace. A planar waveguide technique for forming an optical waveguide device on a planar substrate has been introduced. Also, research into greater integration of optical waveguide devices is continuing to increase.

In a method for manufacturing a common optical waveguide device, an undercladding layer and a core layer are sequentially formed on a substrate. Then, a photoresist is deposited over the core layer and patterned into a photoresist pattern via exposing and developing procedures.

The core layer is etched into a predetermined pattern using the photoresist pattern as an etching mask, and an overcladding layer is formed thereon, resulting in a complete optical waveguide device. The cladding and core layers are formed by spin coating with silica or polymer having a different refractive index for the cladding and core layers.

In the case of using silica as a material for core and cladding layers, the difference in refractive index can be made up to 0.75%. However, the use of silica does not allow for decreasing the size of the optical waveguide, thereby making the production of a subminiature passive device for optical communications difficult.

A possible solution might be to use a polymer such as polyimide as a material for core and cladding layers, the fluorine or chlorine content within polyimide molecule being adjusted to determine the difference in refractive index between core and cladding layers, and in turn manufacture a larger optical waveguide, with reduced optical absorption loss.

However, known polyimides are not satisfactory in varying the difference in the refractive index between core and cladding layers as needed for such a device.

SUMMARY OF THE INVENTION

Therefore, it is an object of the present invention to provide an improved optical waveguide.

It is a further object of the invention to provide an improved subminiature optical waveguide.

It is a yet further object of the invention to provide an optical waveguide with the refractive index difference between the core and cladding easily controllable within a large range.

A still further object of the invention is to provide an optical waveguide device with greater refractive index difference than can be obtained using silica in the waveguide.

The objects of the present invention achieved by an optical waveguide comprising a core layer formed of a polymer, and a cladding layer placed proximate to the core layer, the cladding layer being formed of a polymer having a refractive index smaller than the refractive index of the polymer for the core layer, wherein the polymers for the core and cladding layers are selected from the copolymers having the formula (1)

(1)

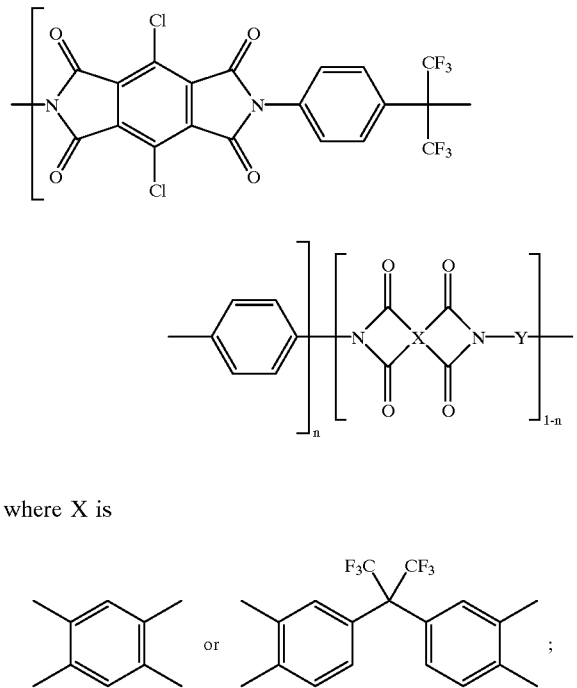

where X is

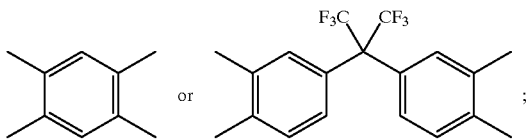

Y is

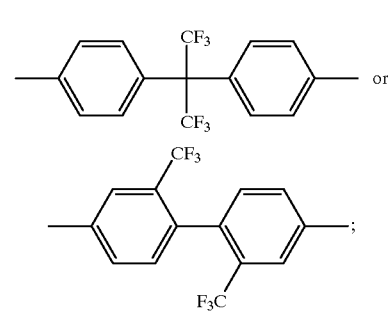

n is a mole fraction in the range of $0.05 \leq n < 1$.

BRIEF DESCRIPTION OF THE DRAWING

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
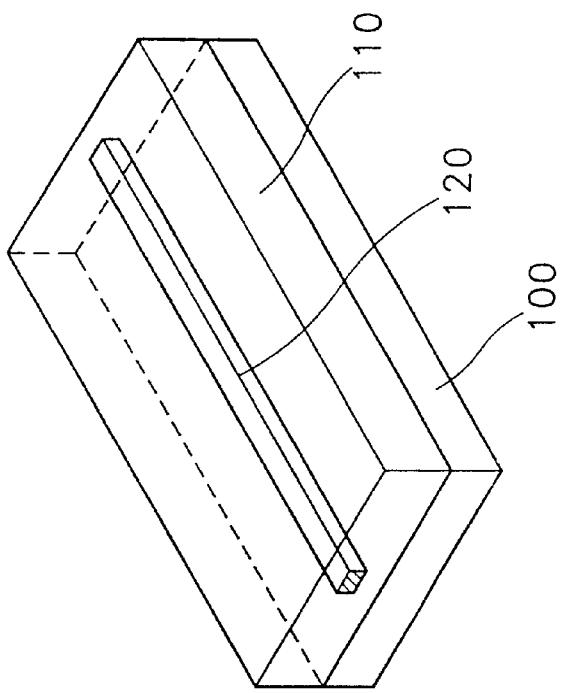
FIG. 1 is a schematic view of the configuration of a common optical waveguide device.

The typical optical device described above is shown in FIG. 1. The core layer is etched into a predetermined pattern using the photoresist pattern as an etching mask, and an overcladding layer is formed thereon, resulting in a complete optical waveguide device as shown in the FIGURE. In FIG. 1, reference numeral 100 represents a planar substrate, reference numeral 110 represents a cladding layer, and reference numeral 120 represents a core layer.

The present invention will now be described in detail. A feature of the present invention is in that the difference in refractive index between core and cladding layers in an optical waveguide can be controlled within the range of 0.25 to 2.0% using the copolymer having the formula (1) hereinabove, and thus the size of optical waveguide can be varied according to the need of a particular applications. As the size of optical waveguide becomes controllable, types of waveguiding mode and a mode field diameter can be varied. If the difference in refractive index between core and cladding layers is great, even smaller optical waveguides can be manufactured.

Preferably, the difference in refractive index between core and cladding layers is within the range of approximately 0.25 to 2.0%. If the refractive index difference is not within the above range, it becomes difficult to confine the optical energy within the waveguide and a problem of mode mismatching between optical waveguide devices and optical fibers occurs.

The copolymers having the formula (1) hereinabove according to the present invention include the following polyimides of the present invention having the formulas (2) or (3).

Here, formulas (2) and (3) each represent random copolymers which can be considered to be made up of two repeating units. In the formulas (2) and (3), n and 1−n represent the mole fractions of the two units of the copolymer. The value of n may be in the range of $0.05 \leq n < 1$. That is, the ratio of the two units may be in the range of approximately 0.05 to a fairly high ratio.

The polyimide having the formula (2) hereinabove is derived from acid anhlydrides (A) and (B) and diamine (E). Here, (A) is 3,6-dichloropyromellitic dianhydride, and (B) is pyromellitic dianhydride. The higher the molar ratio of acid anhydride (A) to anhydride (B), the higher the refractive index of the polyimide having the chemical formula (2). Preferably, the molar ratio of acid anhydrides (A) and (B) is in the range of approximately 0.05:1 to 1:1. If the molar ratio of acid anhydrides (A) and (B) is not within the above range, a problem of great birefringence difference occurs in the transverse electric (TE) and transverse magnetic (TM) modes.

The polyimide having the formula (3) hereinabove is derived from acid anhydrides (A) and (C) and diamine (E). Similar to the polyimide having the formula (2), preferably, the polyimides having the formula (3) have a molar ratio of anhydrides (A) and (C) in the range of approximately 0.05:1 to 1:1.

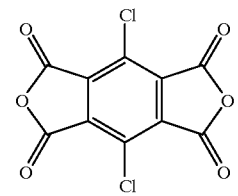

(A)

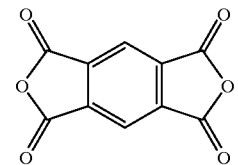

(B)

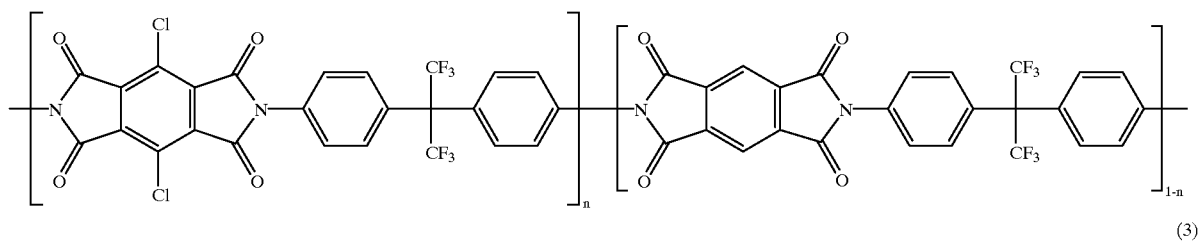

(2)

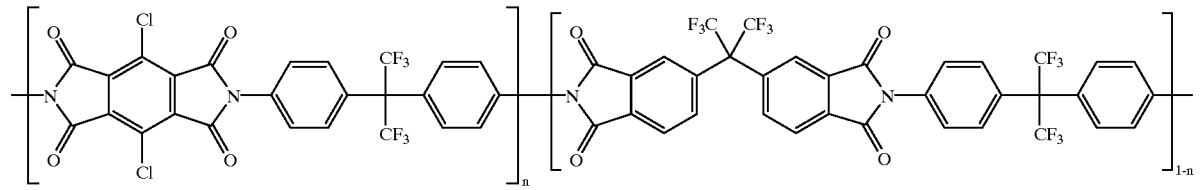

(3)

-continued

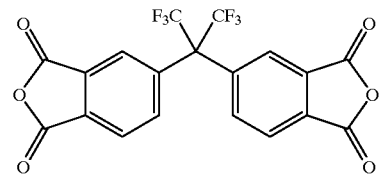

(C)

-continued

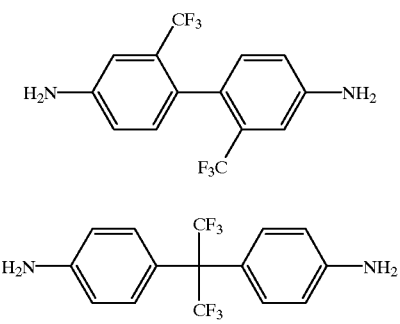

An additional copolymer of the present invention is derived from anhydrides (A) and (C) and diamines (D) and (E). Thus, this copolymer is a random copolymer having units 4(a) and 4(b), as shown below. This is a copolymer formed from two dianhydride and two diamine units, and thus will also have units corresponding to the other two combinations of dianhydride and diamine. Preferably, the molar ratio of anhydrides (A) and (C) from which the copolymer is formed is in the range of approximately 0.05:1 to 1:1. Also, for this polyimide copolymer, it is preferable that the molar ratio of diamines (D) and (E) is in the range of approximately 1:0.1 to 0.1:1. If the molar ratio of diamines (D) and (E) is not within the above range, undesirable birefringence characteristics appear.

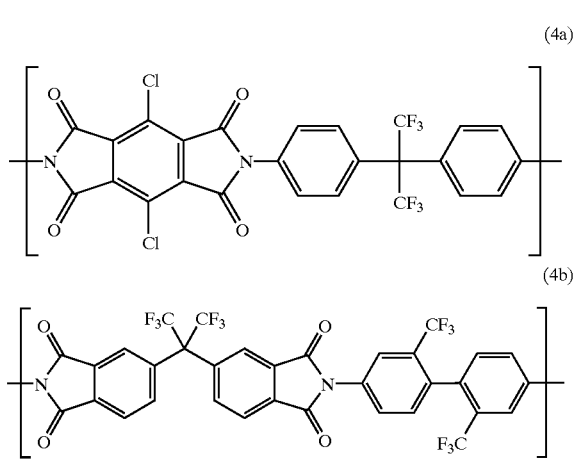

As previously mentioned, the difference in refractive index of core and cladding layers in an optical waveguide can be controlled within the range of 0.25 to 2.0% by using polyimides having the formulas (2), (3) and (4a,b), which allows for the adjustment of the size of optical waveguides, and thus allows the types of modes and mode field diameter to be varied. In particular, if the refractive index difference is greater than or equal to 1.2%, a subminiature optical waveguide device can be manufactured. A refractive index difference close to 0.3% allows for manufacture of an optical waveguide device which results in less combination loss in optical fibers.

The present invention will be described in greater detail by means of the following examples. The following examples are for illustrative purposes and not intended to limit the scope of the invention.

SYNTHESIS EXAMPLE 1

A mixture of acid anhydride (A) and diamine (E) in a molar ratio of 1:1 was dissolved in N,N-dimethylacetamide in the amount of 30% on a solid basis, and stirred in a nitrogen atmosphere to synthesize a polyamic acid. The obtained polyamic acid was spin-coated on silicon substrates and heated on a hot plate at 100° C. for 30 minutes, at 200° C. for 1 hour and at 350° C. for 1 hour, respectively, to form polyimide films.

SYNTHESIS EXAMPLE 2

The process of SYNTHESIS EXAMPLE 1 was followed except that acid anhydride (B) was used instead of acid anhydride (A), to give polyimide films.

SYNTHESIS EXAMPLE 3

The process of SYNTHESIS EXAMPLE 1 was followed except that acid anhydride (C) was used instead of acid anhydride (A), to give polyimide films.

SYNTHESIS EXAMPLE 4

The molar ratio of acid anhydride (A) and acid anhydride (B) was varied to 0.05:1, 0.1:1, 0.5:1 and 1:1, and the molar ratio of the total anhydride and diamine (E) was controlled to be 1:1. The mixture was dissolved in N,N-dimethylacetamide in the amount of 30% on a solid basis, and stirred in a nitrogen atmosphere for 24 hours to give a polyamic acid. The obtained polyamic acid was spin coated on silicon substrates and heated on a hot plate at 100° C. for 30 minutes, at 200° C. for 1 hour and 350° C. for 1 hour, respectively, to give polyimide films.

SYNTHESIS EXAMPLE 5

The molar ratio of acid anhydride (A) and acid anhydride (C) was varied to 0.05:1, 0.1:1, 0.5:1 and 1:1, and the molar ratio of the total anhydride and diamine (E) was controlled to be 1:1. The mixture was dissolved in N,N-dimethylacetamide in the amount of 30% on a solid basis, and stirred in a nitrogen atmosphere for 24 hours to give a polyamic acid. The obtained polyamic acid was spin coated on silicon substrates and heated on a hot plate at 100° C. for 30 minutes, at 200° C. for 1 hour and 350° C. for 1 hour, respectively, to give polyimide films.

SYNTHESIS EXAMPLE 6

The molar ratio of acid anhydride (A) and acid anhydride (C) was varied to 0.05:1, 0.1:1, 0.5:1 and 1:1, the molar ratio of diamine (D) and diamine (E) was varied to 1:0.1, 1:0.5, 1:1 and 0.5:1, and the molar ratio of the total anhydride and the total diamine was controlled to be 1:1. The mixture was dissolved in N,N-dimethylacetamide in the amount of 30% on a solid basis, and stirred in a nitrogen atmosphere for 24 hours to give a polyamic acid. The obtained polyamic acid was spin coated on silicon substrates and heated on a hot plate at 100° C. for 30 minutes, at 200° C. for 1 hour and 350° C. for 1 hour, respectively, to give polyimide films.

Core and cladding layers were formed with the polyimide films obtained in SYNTHESIS EXAMPLES 1 through 6, and processed into optical waveguides.

For the optical waveguides, the combination loss in optical fibers can be reduced. For example, when a difference in refractive index between core and cladding layers is 0.3%, the combination loss in optical fibers was close to 0 dB/facet. When a difference in refractive index between core and cladding layers is 0.5%, the combination loss in optical fibers was close to 0.3 dB/facet.

As described above, by using polyimides which allow easy control of the refractive index in the formation of an optical waveguide, the difference in refractive index between the core and cladding layers of the optical waveguide can be further increased compared to the case of using silica. As a result, a subminiature passive device for optical communications can be manufactured. While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An optical waveguide, comprising:
   a core formed of a first polymer; and
   a cladding formed of a second polymer and proximate to said core;
   the refractive index of said second polymer being less than that of said first polymer; and
   said first and second polymers each being independently a random copolymer comprising:
   a first unit which is

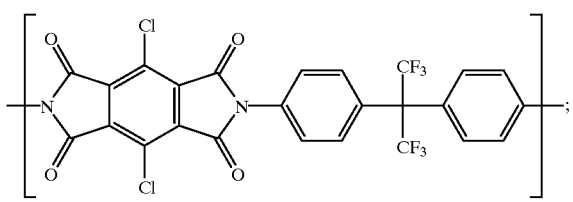

and
   a second unit which is selected from,

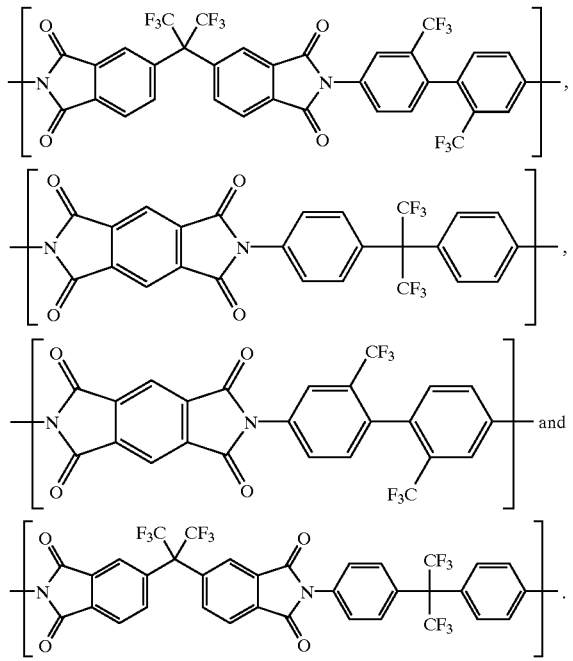

2. The optical waveguide of claim 1, the difference in refractive index between said first and second polymers being in the range of approximately 0.25 to 2.0%.

3. The optical waveguide of claim 2, the difference in refractive index between said first and second polymers being approximately 0.3%.

4. The optical waveguide device of claim 2, said optical waveguide device being a subminiature optical waveguide device and the difference in refractive index between said first and second polymers being greater than or equal to 1.2%.

5. The optical waveguide of claim 1, said second unit being

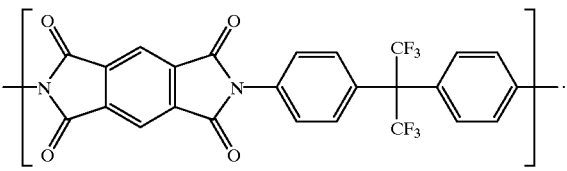

6. The optical waveguide of claim 1, said second unit being

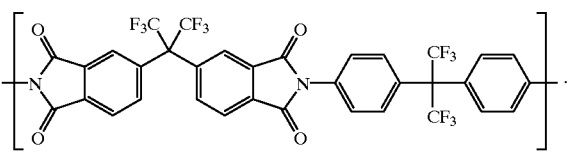

7. The optical waveguide of claim 1, said second unit being:

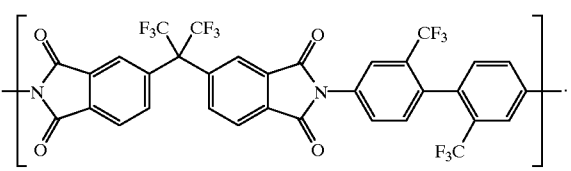

8. The optical waveguide of claim 1, the mole ratio of said first unit to said second unit being in the range of approximately 0.05:1 to 1:1.

9. An optical waveguide, comprising:
   a core formed of a first polymer; and
   a cladding formed of a second polymer and proximate to said core;
   the refractive index of said second polymer being less than that of said first polymer; and
   said first and second polymers each being independently a random copolymer formed by the condensation of a mixture comprising:
   a first dianhydride which is 3,6-dichloropyromellitic dianhydride;
   a second dianhydride selected from pyromellitic dianhydride and

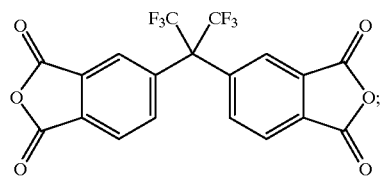

and
  a diamine selected from

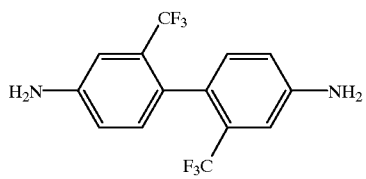

and

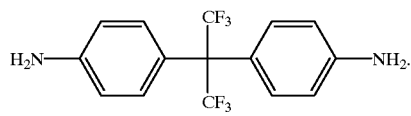

10. The optical waveguide of claim 9, the difference in refractive index between said first and second polymers being in the range of approximately 0.25 to 2.0%.

11. The optical waveguide of claim 10, the difference in refractive index between said first and second polymers being approximately 0.3%.

12. The optical waveguide device of claim 10, said optical waveguide device being a subminiature optical waveguide device and the difference in refractive index between said first and second polymers being greater than or equal to 1.2%.

13. The optical waveguide of claim 9, the mole ratio of said first and second dianhydrides being in the range of approximately 0.05:1 to 1:1.

14. The optical waveguide of claim 9, said mixture comprising both diamines

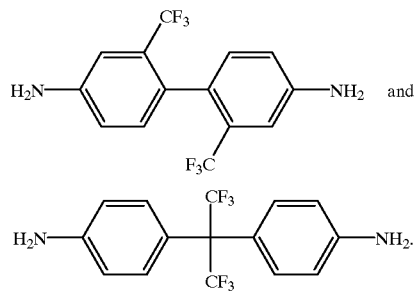

15. The optical waveguide of claim 14, said second dianhydride being

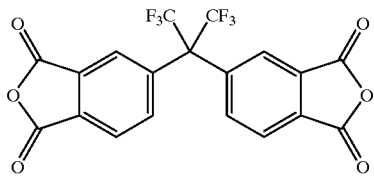

16. The optical waveguide of claim 15, the ratio of

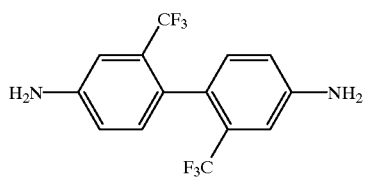

to

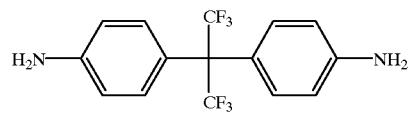

in said mixture being in the range of approximately 1:0.1 to 0.1:1, and the mole ratio of said first and second dianhydrides being in the range of approximately 0.05:1 to 1:1.

17. The optical waveguide of claim 9, said second dianhydride being pyromellitic dianhydride and said second diamine being

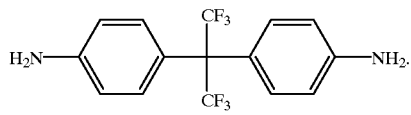

18. The optical waveguide of claim 9, said second dianhydride being

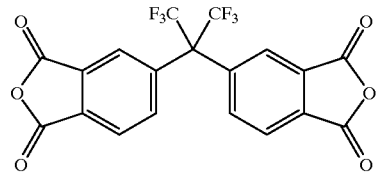

and said second diamine being

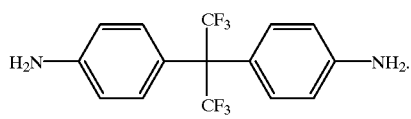

19. The optical waveguide device of claim 9, said core being formed by spin-coating a polyamic acid resulting from the reaction of said mixture for making the first polymer, and then heating the spin-coated polyamic acid.

* * * * *